US012749707B2

(12) United States Patent
Horie et al.

(10) Patent No.: US 12,749,707 B2
(45) Date of Patent: Sep. 29, 2026

(54) NONAQUEOUS ELECTROLYTE SECONDARY BATTERY POROUS LAYER

(71) Applicant: SSLM Co., Ltd., Daegu (KR)

(72) Inventors: Kensaku Horie, Niihama (JP); Makoto Furukawa, Niihama (JP); Takahiro Kuwata, Niihama (JP)

(73) Assignee: SSLM CO., LTD., Daegu (KR)

( * ) Notice: Subject to any disclaimer, the term of this patent is extended or adjusted under 35 U.S.C. 154(b) by 775 days.

(21) Appl. No.: 18/075,899

(22) Filed: Dec. 6, 2022

(65) Prior Publication Data

US 2023/0207873 A1 Jun. 29, 2023

(30) Foreign Application Priority Data

Dec. 7, 2021 (JP) ................................ 2021-198751

(51) Int. Cl.
*H01M 10/0565* (2010.01)
*H01M 50/417* (2021.01)
*H01M 50/491* (2021.01)

(52) U.S. Cl.
CPC ..... *H01M 10/0565* (2013.01); *H01M 50/417* (2021.01); *H01M 50/491* (2021.01); *H01M 2300/0082* (2013.01)

(58) Field of Classification Search
CPC .................................................. H01M 50/423
See application file for complete search history.

(56) References Cited

FOREIGN PATENT DOCUMENTS

| | | | | | |
|---|---|---|---|---|---|
| JP | 2003-40999 | A | | 2/2003 | |
| JP | 2004-269655 | A | | 9/2004 | |
| JP | 2007125821 | A | | 5/2007 | |
| JP | 2014194922 | A | * | 10/2014 | |
| WO | WO-2016073580 | A1 | * | 5/2016 | ............ B29C 48/78 |

* cited by examiner

*Primary Examiner* — Stephan J Essex
(74) *Attorney, Agent, or Firm* — Panitch Schwarze Belisario & Nadel LLP

(57) ABSTRACT

Provided is a nonaqueous electrolyte secondary battery porous layer which is capable of improving a capacity maintenance ratio shown when a nonaqueous electrolyte secondary battery is repeatedly subjected to a charge-discharge cycle. The nonaqueous electrolyte secondary battery porous layer contains at least one type of a resin having an amide bond, and an aspect ratio of a pore therein is not less than 1.0 and not more than 2.2.

7 Claims, No Drawings

NONAQUEOUS ELECTROLYTE SECONDARY BATTERY POROUS LAYER

CROSS-REFERENCE TO RELATED APPLICATIONS

This application claims priority under 35 U.S.C. § 119(b) to Japanese Application No. 2021-198751, filed Dec. 7, 2021, the disclosure of which is incorporated herein by reference in its entirety.

TECHNICAL FIELD

The present invention relates to a porous layer for a nonaqueous electrolyte secondary battery (hereinafter, referred to as a "nonaqueous electrolyte secondary battery porous layer").

BACKGROUND ART

Nonaqueous electrolyte secondary batteries, particularly lithium-ion secondary batteries, have high energy densities, and are thus in wide use as batteries for personal computers, mobile telephones, portable information terminals, and the like. Recently, such nonaqueous electrolyte secondary batteries have been developed as batteries for vehicles.

The end-of-charge voltages of conventional nonaqueous electrolyte secondary batteries are approximately 4.1 V to 4.2 V (4.2 V to 4.3 V (vs $Li/Li^+$) as voltages relative to the electric potentials of lithium reference electrodes). In contrast, the end-of-charge voltages of recent nonaqueous electrolyte secondary batteries are increased to not less than 4.3 V, which is higher than those of the conventional nonaqueous electrolyte secondary batteries, so that the utilization rates of positive electrodes are increased and thereby the capacities of batteries are increased. For this purpose, it is important that resins contained in nonaqueous electrolyte secondary battery porous layers do not change in quality even when the resins are placed under high-voltage conditions.

Patent Literature 1 is one of documents which disclose resins having such a property. Patent Literature 1 discloses a wholly aromatic polyamide in which aromatic rings located at the respective terminals of its molecular chain each does not have an amino group and in which one or more aromatic rings each have an electron-withdrawing substituent. According to Patent Literature 1, the wholly aromatic polyamide hardly changes in color even when the wholly aromatic polyamide receives a high voltage.

CITATION LIST

Patent Literature

[Patent Literature 1]
Japanese Patent Application Publication Tokukai No. 2003-40999

SUMMARY OF INVENTION

Technical Problem

However, a nonaqueous electrolyte secondary battery porous layer which contains a resin as disclosed in Patent Literature 1 has room for improvement in terms of a capacity maintenance ratio shown when a charge-discharge cycle is repeated.

Solution to Problem

The inventors of the present invention have found, as a result of diligent study, that it is possible, by controlling an aspect ratio of a pore in a nonaqueous electrolyte secondary battery porous layer to fall within a specific range, to improve the capacity maintenance ratio shown when a nonaqueous electrolyte secondary battery including the nonaqueous electrolyte secondary battery porous layer is repeatedly subjected to a charge-discharge cycle, and conceived of the present invention.

The present invention has aspects described in <1> through <6> below.

<1> A nonaqueous electrolyte secondary battery composition which is a nonaqueous electrolyte secondary battery porous layer containing at least one type of a resin having an amide bond, an aspect ratio of a pore which is represented by Formula (1) below being not less than 1.0 and not more than 2.2.

$$\text{Aspect ratio of pore} = 2a/2b \qquad \text{Formula (1)}$$

where: 2a represents a greatest diameter of a pore in the porous layer; and 2b represents, in an ellipsoid obtained by rotating the pore of the porous layer about a central axis which coincides with the greatest diameter, a greatest diameter in a direction perpendicular to the central axis.

<2> The nonaqueous electrolyte secondary battery porous layer described in <1>, in which: at least one type of the resin having the amide bond is a block copolymer including a block A containing, as a main component, units each represented by Formula (2) below, and a block B containing, as a main component, units each represented by Formula (3) below.

$$\text{—(NH—}Ar^1\text{—NHCO—}Ar^2\text{—CO)—} \qquad \text{Formula (2)}$$

$$\text{—(NH—}Ar^3\text{—NHCO—}Ar^4\text{—CO)—} \qquad \text{Formula (3)}$$

In Formulae (2) and (3):

$Ar^1$, $Ar^2$, $Ar^3$, and $Ar^4$ may each vary from unit to unit, $Ar^1$, $Ar^2$, $Ar^3$, and $Ar^4$ are each independently a divalent group having one or more aromatic rings, not less than 50% of all $Ar^1$ each have a structure in which two aromatic rings are connected by a sulfonyl bond, not more than 50% of all $Ar^3$ each have a structure in which two aromatic rings are connected by a sulfonyl bond, and 10% to 70% of all $Ar^1$ and $Ar^3$ each have a structure in which two aromatic rings are connected by a sulfonyl bond.

<3> The nonaqueous electrolyte secondary battery porous layer described in <1> or <2>, further including a filler, a contained amount of the filler being not less than 20% by weight and not more than 90% by weight relative to a total weight of the nonaqueous electrolyte secondary battery porous layer.

<4> A nonaqueous electrolyte secondary battery laminated separator including: a polyolefin porous film; and the nonaqueous electrolyte secondary battery porous layer described in any one of <1> through <3>, the nonaqueous electrolyte secondary battery porous layer being formed on one surface or both surfaces of the polyolefin porous film.

<5> A nonaqueous electrolyte secondary battery member, including a positive electrode, the nonaqueous electrolyte secondary battery porous layer described in any one of <1> through <3> or the nonaqueous electrolyte secondary battery laminated separator described in <4>, and a negative electrode which are disposed in this order.

<6> A nonaqueous electrolyte secondary battery including: the nonaqueous electrolyte secondary battery porous layer described in any one of <1> through <3>; or the nonaqueous electrolyte secondary battery laminated separator described in <4>.

Advantageous Effects of Invention

The nonaqueous electrolyte secondary battery porous layer in accordance with an embodiment of the present invention brings about an effect of improving a capacity maintenance ratio shown when a nonaqueous electrolyte secondary battery is repeatedly subjected to a charge-discharge cycle.

DESCRIPTION OF EMBODIMENTS

The following description will discuss embodiments of the present invention. Note, however, that the present invention is not limited to the embodiments. The present invention is not limited to arrangements described below, but may be altered in various ways by a skilled person within the scope of the claims. The present invention also encompasses, in its technical scope, any embodiment derived by appropriately combining technical means disclosed in differing embodiments. Note that a numerical expression "A to B" herein means "not less than A and not more than B" unless otherwise stated.

Embodiment 1: Nonaqueous Electrolyte Secondary Battery Porous Layer

A nonaqueous electrolyte secondary battery porous layer in accordance with Embodiment 1 of the present invention (hereinafter simply referred to also as "porous layer") is a nonaqueous electrolyte secondary battery porous layer including at least one type of a resin having an amide bond, an aspect ratio of a pore which is represented by Formula (1) below being not less than 1.0 and not more than 2.2.

$$\text{Aspect ratio of pore}=2a/2b \qquad \text{Formula (1)}$$

where: 2a represents a greatest diameter of a pore in the porous layer; and 2b represents, in an ellipsoid obtained by rotating the pore of the porous layer about a central axis which coincides with the greatest diameter, a greatest diameter in a direction perpendicular to the central axis.

<Aspect Ratio of Pore>

The "aspect ratio of a pore" in an embodiment of the present invention is an index which indicates how close the shape of a pore in the porous layer is to a perfect circle when the porous layer is laterally observed. A smaller "aspect ratio of a pore" indicates that the shape of the pore in the porous layer is closer to a perfect circle. In other words, the fact that the "aspect ratio of a pore" is small means that the shape of the pore in the porous layer is highly isotropic.

In a case where a nonaqueous electrolyte secondary battery is repeatedly charged and discharged, an electrode expands and contracts, so that pressure is applied to a porous layer included in the nonaqueous electrolyte secondary battery. When the pressure is applied, pores in the porous layer included in the nonaqueous electrolyte secondary battery are deformed and blocked, and as a result, ion permeability of the porous layer may decrease, and a capacity of the nonaqueous electrolyte secondary battery may decrease.

Note, here, that a pore which has high isotropy is more likely to cause external pressure to spread over the entire pore, as compared with a pore which has lower isotropy. Therefore, the pore having high isotropy is less likely to be blocked. In the porous layer in accordance with an embodiment of the present invention, the "aspect ratio of a pore" is set to a small value of not more than 2.2, and thus the pores are less likely to be blocked by the pressure. Therefore, in the nonaqueous electrolyte secondary battery including the porous layer in accordance with an embodiment of the present invention, when a charge-discharge cycle is repeated, a decrease in capacity due to the above described pressure is inhibited, and as a result, a capacity maintenance ratio shown when the charge-discharge cycle is repeated is improved.

From the viewpoint of the improvement in the capacity maintenance ratio shown when the charge-discharge cycle is repeated, the "aspect ratio of a pore" of the porous layer in accordance with an embodiment of the present invention is preferably not more than 2.15, and more preferably not more than 2.13.

It is clarified that the above "2a" represents a greatest diameter of a pore, and the above "2b" represents a value that is not more than that of "2a". From this, a minimum value of the "aspect ratio of a pore" is 1.0.

In an embodiment of the present invention, in a case where the "aspect ratio of a pore" is greater than 1.0 and pores in the porous layer are highly anisotropic to some extent, a structure of pores in the porous layer is complicated. This causes a gas, which is derived from oxidative decomposition of an electrolyte or the like produced as a byproduct at a surface of an electrode during charge and discharge of a battery, to be less likely to enter the porous layer. This prevents occurrence of a case where permeation of ions which are charge carriers is hindered due to entrance of the oxidative decomposition gas. As a result, it is possible to inhibit a decrease in capacity maintenance ratio shown when the nonaqueous electrolyte secondary battery including the porous layer is repeatedly subjected to a charge-discharge cycle.

From the viewpoint of the inhibition of a decrease in capacity maintenance ratio shown when the charge-discharge cycle is repeated, it is preferable that the "aspect ratio of a pore" of the porous layer in accordance with an embodiment of the present invention is not less than 1.3.

<Method of Calculating Aspect Ratio of Pore>

In an embodiment of the present invention, the "aspect ratio of a pore" can be calculated specifically by the following method. Measurement of the values of "2a" and "2b" described later may be carried out only for the porous layer, or may be carried out for a nonaqueous electrolyte secondary battery laminated separator in which the porous layer is formed on a base material (described later).

The porous layer or the nonaqueous electrolyte secondary battery laminated separator is regarded as a measurement sample. An arbitrary portion (e.g. a straight portion that passes through a center of the measurement sample and extends in parallel with the machine direction (MD)) on a surface of the measurement sample is cut in a direction perpendicular to the surface by an ion milling method (IB-19520 (manufactured by JEOL Ltd.)). A cross section of the measurement sample thus obtained is observed with use of a scanning electron microscope (SEM, S-4800 (manufactured by Hitachi High-Technologies Corporation)) under conditions in which an acceleration voltage is 0.8 kV, a working distance (WD) is 3 mm, a reflection electron image is obtained, and an image resolution is 2.48 nm/pix. Thus, a cross-sectional view is obtained. Subsequently, an image analysis is carried out with respect to the cross-sectional view, and an image is obtained in which pores and a solid portion in the porous layer are shown in two gradation levels. With respect to the image, an area of an arbitrary one of pores in the porous layer is measured. Moreover, a greatest diameter of the one pore whose area has been measured is measured, and the greatest diameter thus measured is regarded as “2a”. Further, the one pore whose area and greatest diameter have been measured is approximated to an ellipsoid by rotating the one pore about a central axis which coincides with the greatest diameter, and a greatest diameter of the ellipsoid in a direction perpendicular to the central axis is measured and regarded as “2b”. These measurements can be carried out, for example, by software (TRI/3D-BON-FCS: 2D particle analysis option) manufactured by Ratoc System Engineering Co., Ltd.

After that, the aspect ratio of the one pore is calculated on the basis of the following Formula (1) with use of the measured values of “2a” and “2b”.

$$\text{Aspect ratio of pore}=2a/2b \qquad \text{Formula (1)}$$

Subsequently, the aspect ratio is calculated for all of the pores in the image with the above described method, and then an area-weighted average value of the obtained aspect ratios of all of the pores is regarded as the “aspect ratio of a pore” in the porous layer.

Alternatively, the “aspect ratio of a pore” may be measured as follows: a plurality of different portions on the surface of the measurement sample are cut in a direction perpendicular to the surface to obtain a plurality of cross sections; a plurality of images in each of which pores and a solid portion are shown in two gradation levels are obtained from the plurality of cross sections; and the aspect ratio of a pore is calculated for each of the plurality of obtained images. In this case, the aspect ratio is calculated for all of the pores in the plurality of images, and then an area-weighted average value of the obtained aspect ratios of all of the pores is regarded as the aspect ratio in the porous layer.

The solid portion is a portion of the porous layer other than the pores, in other words, a portion formed from a solid component such as a resin and a filler.

In the above described image analysis, in a case where an aggregate of fine particles of a filler and the like which are contained in the solid portion exhibits an intermediate contrast, an image computation function is used to carry out a process of extracting only the intermediate contrast portion and superimposing the intermediate contrast portion on a resin portion. By this process, it is possible to obtain an image in which the aggregate of fine particles is shown in two gradation levels as a solid portion.

<Method of Adjusting Aspect Ratio of Pore>

As later described in “Method of producing nonaqueous electrolyte secondary battery laminated separator”, the porous layer is typically formed by coating a base material with a coating solution which is prepared by dissolving or dispersing a component constituting the porous layer in a solvent such as N-methylpyrrolidone (NMP), and then removing the solvent and depositing the component constituting the porous layer on the base material. Note, here, that a shape of each of pores in a porous layer that is formed can be controlled by adjusting deposition property (e.g., a time taken for deposition) of a component constituting the porous layer. Specifically, in a case where the time taken for deposition is long, the “aspect ratio of a pore” in a porous layer formed decreases.

A method of adjusting the “aspect ratio of a pore” to a range of not less than 1.0 and not more than 2.2 by controlling the deposition property of a component constituting the porous layer can be, for example, the following methods: (a) a method in which, as a resin which has an amide bond and which is a component constituting the porous layer, a resin is used which is highly soluble in a solvent in the coating solution; (b) a method in which a concentration of component constituting the porous layer is reduced in the coating solution; and (c) a method in which a deposition temperature is increased when a component constituting the porous layer is deposited on the base material.

By employing one or more methods of (a) through (c), the component constituting the porous layer is less likely to be deposited from the coating solution, and the deposition rate is reduced. This makes it possible to reduce the “aspect ratio of a pore” and to control the aspect ratio to fall within a range of not less than 1.0 and not more than 2.2.

In regard to the method (a), examples of the resin which is highly soluble in the solvent in the coating solution include a resin which has an amide bond and which is constituted by a block copolymer that contains a block A containing, as a main component, units each represented by Formula (2) and a block B containing, as a main component, units each represented by Formula (3), which will be described later.

In regard to the method (b), the concentration of the component constituting the porous layer in the coating solution is preferably not more than 10.0% by weight, and more preferably not more than 7.0% by weight, with respect to the total weight of the coating solution.

In regard to the method (c), a suitable deposition temperature may vary depending on the component constituting the porous layer and the type of the solvent. For example, the deposition temperature is preferably not less than 20° C., and more preferably not less than 30° C.

<Resin Having Amide Bond>

The porous layer in accordance with an embodiment of the present invention contains at least one type of a resin having an amide bond. The resin having an amide bond may be one type of resin or a mixture of two or more types of resins.

The resin having an amide bond has a structure in which divalent groups are connected by chemical bonds and at least one of the chemical bonds is an amide bond. The resin having an amide bond can be prepared by a polymerization method in which the divalent groups are sequentially connected to each other through the chemical bonds. In the resin having an amide bond, the amide bond accounts for preferably 45% to 85% and more preferably 55% to 75% of the chemical bonds, from the viewpoint of heat resistance of the porous layer.

The divalent groups are not particularly limited. In an embodiment of the present invention, the divalent groups preferably include a divalent aromatic group, and more preferably all of the divalent groups are divalent aromatic groups. The divalent groups may be one type of group or may be two or more types of groups.

In this specification, a “divalent aromatic group” indicates a divalent group that contains an unsubstituted aromatic ring or a substituted aromatic ring, and preferably indicates a divalent group which is constituted by an unsubstituted aromatic ring or a substituted aromatic ring. An “aromatic ring" indicates a cyclic compound which satisfies the Hückel's rule. Examples of the aromatic ring include benzene, naphthalene, anthracene, azulene, pyrrole, pyridine, furan, and thiophene. In an embodiment of the present invention, the aromatic ring is composed solely of carbon atoms and hydrogen atoms. In an embodiment of the present invention, the aromatic ring is a benzene ring or a condensed ring derived from two or more benzene rings (such as naphthalene and anthracene).

In an embodiment of the present invention, a substituent in the divalent group is not particularly limited. In an embodiment of the present invention, the substituent in the divalent group is preferably an electron-withdrawing substituent from the viewpoint of obtaining a nonaqueous electrolyte secondary battery porous layer which is less prone to change in quality even under a high-voltage condition and which has high-voltage resistance. The electron-withdrawing substituent is not particularly limited. Examples of the electron-withdrawing substituent include a carboxyl group, an alkoxycarbonyl group, a nitro group, a halogen atom, and the like.

The chemical bonds may be only amide bonds or may include a bond different from the amide bond. The bond different from the amide bond is not particularly limited. Examples of the bond different from the amide bond include sulfonyl bonds, alkenyl bonds (e.g., C1-C5 alkenyl bonds), ether bonds, ester bonds, imide bonds, ketone bonds, sulfide bonds, and the like. The bond different from the amide bond may be one type of bond or may be two or more types of bonds.

In an embodiment of the present invention, it is preferable that the bond different from the amide bond includes a bond which has stronger electron-withdrawing property than the amide bond, from the viewpoint of obtaining a porous layer having high-voltage resistance. From the viewpoint of further improving the high-voltage resistance of the porous layer, a proportion of the bond which has the stronger electron-withdrawing property than the amide bond in the chemical bonds is more preferably 15% to 35% and further preferably 25% to 35%.

Examples of the bond having the stronger electron-withdrawing property than the amide bond include sulfonyl bonds, ester bonds, and the like among the above listed chemical bonds.

Specific examples of the resin having an amide bond include: polyamides; polyamide imides; and a copolymer of polyamide or polyamide imide and a polymer having one or more bonds which are selected from sulfonyl bonds, ether bonds, and ester bonds. The copolymer may be a block copolymer or may be a random copolymer.

The polyamides are preferably aromatic polyamides. Examples of the aromatic polyamides include wholly aromatic polyamides (aramid resins) and semi-aromatic polyamides. The aromatic polyamides are preferably wholly aromatic polyamides. Examples of the aromatic polyamides include para-aramids and meta-aramids.

The polyamide imides are preferably aromatic polyamide imides. Examples of the aromatic polyamide imides include wholly aromatic polyamide imides and semi-aromatic polyamide imides. The aromatic polyamide imides are preferably wholly aromatic polyamide imides.

Examples of the polymer which constitutes the copolymer and which has one or more bonds selected from the sulfonyl bonds, the ether bonds, and the ester bonds include polysulfone, polyether, polyester, and the like.

Specific preferable examples of the resin having an amide bond in an embodiment of the present invention include a wholly aromatic polyamide-based resin containing, as a main component, units each represented by Formula (4) below, meta-aramid, and the like. Note that the phrase "main component" means that, among all units contained in the wholly aromatic polyamide-based resin, the units each represented by Formula (4) account for not less than 50%, preferably not less than 80%, more preferably not less than 90%, and further preferably not less than 95%.

$$—(NH—Ar^5—NHCO—Ar^6—CO)— \qquad \text{Formula (4)}$$

In Formula (4), $Ar^5$ and $Ar^6$ may each vary from unit to unit. $Ar^5$ and $Ar^6$ are each independently a divalent group having one or more aromatic rings.

Not less than 50% of all $Ar^5$ each have a structure in which two aromatic rings are connected by a sulfonyl bond. The lower limit of the proportion of $Ar^5$ having this structure is more preferably not less than 60% and further preferably not less than 80% of all $Ar^5$. Examples of $—Ar^5—$ having such a structure include 4,4'-diphenylsulfonyl, 3,4'-diphenylsulfonyl, and 3,3'-diphenylsulfonyl.

Examples of $—Ar^5—$ not having the structure in which two aromatic rings are connected by a sulfonyl bond and $—Ar^6—$ include the following.

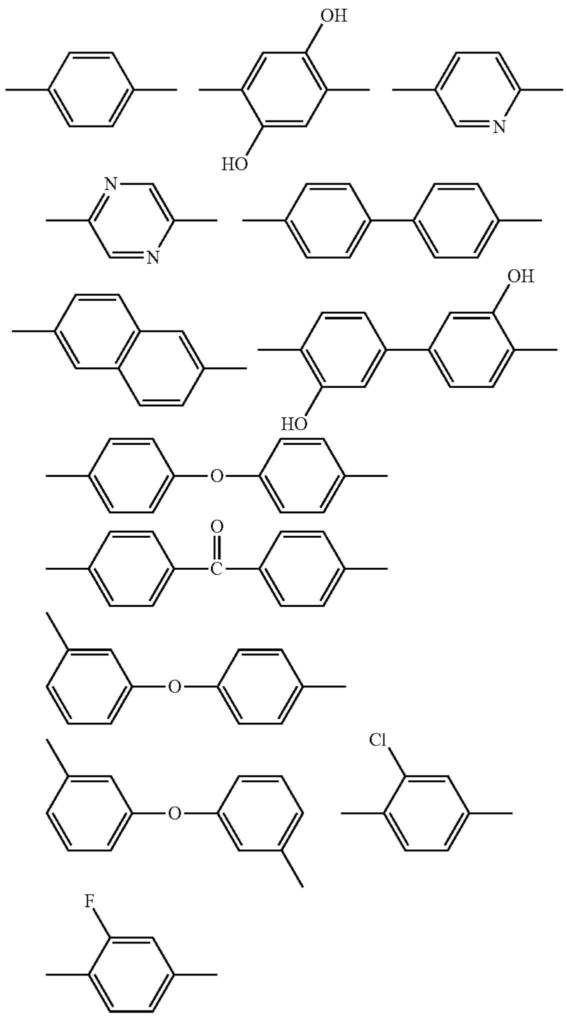

In an embodiment of the present invention, $—Ar^5—$ having the structure in which two aromatic rings are connected by a sulfonyl bond is 4,4'-diphenylsulfonyl. In an embodiment of the present invention, —$Ar^5$— not having the structure in which two aromatic rings are connected by a sulfonyl bond and —$Ar^6$— are paraphenyl.

In an embodiment of the present invention, the wholly aromatic polyamide-based resin containing, as a main component, units each represented by Formula (4) is, for example, an aromatic polyamide having (i) diamine units each derived from 4,4'-diaminodiphenylsulfone and paraphenylenediamine and (ii) dicarboxylic acid units each derived from terephthalic acid (or halogenated terephthalic acid). In another embodiment of the present invention, the wholly aromatic polyamide-based resin containing, as a main component, units each represented by Formula (4) is an aromatic polyamide having (i) diamine units each derived from 4,4'-diaminodiphenylsulfone and (ii) dicarboxylic acid units each derived from terephthalic acid (or halogenated terephthalic acid). Monomers contained in these units are readily available, and also these units are easy to handle.

The wholly aromatic polyamide-based resin which contains, as a main component, the units each represented by Formula (4) may have a structure which is composed of units other than the units each represented by Formula (4). Examples of such a structure include a polyimide backbone.

The wholly aromatic polyamide-based resin containing, as a main component, units each represented by Formula (4) may be used alone, or two or more types of the wholly aromatic polyamide-based resins may be alternatively used in combination.

The wholly aromatic polyamide-based resin containing, as a main component, units each represented by Formula (4) can be synthesized according to a conventional method. For example, the wholly aromatic polyamide-based resin containing, as a main component, units each represented by Formula (4) can be synthesized by polymerizing a diamine represented by $NH_2$—$Ar^5$—$NH_2$ and a dicarboxylic dihalide represented by X—C(═O)—$Ar^6$—C(═O)—X (X is a halogen atom such as F, Cl, Br, and I), which serve as monomers, according to a publicly known polymerization method for forming an aromatic polyamide.

The meta-aramid represents a wholly aromatic polyamide having an aromatic ring having an amide bond at a meta position. Specific examples of the meta-aramid include poly(metaphenylene terephthalamide), poly(metaphenylene isophthalamide), and the like. Among the above meta-aramids, poly(metaphenylene terephthalamide) is more preferable from the viewpoint of making it easier to produce the cyclic component. The meta-aramid may be used alone or two or more of the meta-aramids may be alternatively used in combination.

In an embodiment of the present invention, from the viewpoint of controlling the "aspect ratio of a pore" to fall within a suitable range, the resin having the amide bond is preferably a block copolymer which has a block A containing, as a main component, units each represented by the following Formula (2) and a block B containing, as a main component, units each represented by the following Formula (3).

—(NH—$Ar^1$—NHCO—$Ar^2$—CO)— Formula (2)

—(NH—$Ar^3$—NHCO—$Ar^4$—CO)— Formula (3)

where: $Ar^1$, $Ar^2$, $Ar^3$, and $Ar^4$ may each vary from unit to unit; $Ar^1$, $Ar^2$, $Ar^3$, and $Ar^4$ are each independently a divalent group having one or more aromatic rings; not less than 50% of all $Ar^1$ each have a structure in which two aromatic rings are connected by a sulfonyl bond; not more than 50% of all $Ar^3$ each have a structure in which two aromatic rings are connected by a sulfonyl bond; 10% to 70%, preferably 10% to 50% of all $Ar^1$ and $Ar^3$ each have a structure in which two aromatic rings are connected by a sulfonyl bond.

Here, in the block copolymer, it is preferable that: not less than 50% of the units which are contained in the block A and which are each represented by Formula (2) are each 4,4'-diphenylsulfonyl terephthalamide; and not less than 50% of the units which are contained in the block B and which are each represented by Formula (3) are each paraphenylene terephthalamide. Moreover, the block copolymer more preferably has a triblock structure of the block B—the block A—the block B. Furthermore, it is more preferable that: in a molecule corresponding to a mode in a molecular weight distribution of the block copolymer, the block A contains 10 to 1000 units each represented by Formula (2), and the block B contains 10 to 500 units each represented by Formula (3).

Another preferable example of the resin having an amide bond is a polymer which does not contain units each represented by Formula (2) but contains 5 to 200 units each represented by Formula (3).

In an embodiment of the present invention, a contained amount of the resin having an amide bond in the porous layer is preferably 10% by weight to 90% by weight, and more preferably 20% by weight to 70% by weight, with respect to the total weight of the porous layer.

An intrinsic viscosity of the resin having the amide bond is preferably 1.0 dL/g to 2.0 dL/g, and more preferably 1.1 dL/g to 1.9 dL/g, from the viewpoint of controlling deposition property.

[Filler]

The porous layer in accordance with an embodiment of the present invention can contain a filler.

As to the filler, there are the following types of fillers: organic fillers and inorganic fillers.

Examples of the organic fillers include: homopolymers and copolymers which are each obtained from one or more monomers such as styrene, vinyl ketone, acrylonitrile, methyl methacrylate, ethyl methacrylate, glycidyl methacrylate, glycidyl acrylate, and/or methyl acrylate; fluorine-based resins such as polytetrafluoroethylene, a tetrafluoroethylene-hexafluoropropylene copolymer, a tetrafluoroethylene-ethylene copolymer, and polyvinylidene fluoride; melamine resins; urea resins; polyolefins; and polymethacrylates. Each of these organic fillers may be used alone or two or more of these organic fillers may be alternatively used in combination. Among these organic fillers, a polytetrafluoroethylene powder is preferable in terms of chemical stability.

Examples of the inorganic fillers include materials each made of an inorganic matter such as metal oxide, metal nitride, metal carbide, metal hydroxide, carbonate, or sulfate. Specific examples of the inorganic fillers include: powders of aluminum oxide (such as alumina), boehmite, silica, titania, magnesia, barium titanate, aluminum hydroxide, calcium carbonate, and the like; and minerals such as mica, zeolite, kaolin, and talc. Each of these inorganic fillers may be used alone or two or more of these inorganic fillers may be alternatively used in combination. Among these inorganic fillers, aluminum oxide is preferable in terms of chemical stability.

The shape of each of particles of the filler can be a substantially spherical shape, a plate shape, a columnar shape, a needle shape, a whisker shape, a fibrous shape, or the like. The particles can have any shape. The particles preferably have a substantially spherical shape, because such particles facilitate formation of uniform pores.

The average particle diameter of the filler is preferably 0.01 μm to 1 μm. In this specification, the "average particle diameter of the filler" indicates a volume-based average particle diameter (D50) of the filler. "D50" means a particle diameter having a value at which a cumulative value reaches 50% in a volume-based particle size distribution. D50 can be measured with use of, for example, a laser diffraction particle size analyzer (product names: SALD2200, SALD2300, etc., manufactured by Shimadzu Corporation).

A contained amount of the filler is preferably 20% by weight to 90% by weight, and more preferably 30% by weight to 80% by weight, with respect to the total weight of the porous layer. In a case where the contained amount of the filler falls within the above range, the resulting porous layer has sufficient ion permeability.

[Other Components]

The porous layer in accordance with an embodiment of the present invention may contain a component different from the resin having an amide bond and the filler, as long as such a component does not prevent the object of the present invention from being attained. The other component to be contained may be, for example, a resin different from the resin having an amide bond and an additive which is generally used in a nonaqueous electrolyte secondary battery porous layer. The other component may be one type or may be a mixture of two or more types.

Examples of the resin different from the resin having an amide bond include: polyolefins; (meth)acrylate-based resins; fluorine-containing resins; polyester-based resins; rubbers; resins each having a melting point or a glass transition temperature of not lower than 180° C.; water-soluble polymers; polycarbonates, polyacetals, polyether ether ketones, polybenzimidazoles, polyurethanes, melamine resins, and the like.

Examples of the additive include flame retardants, antioxidants, surfactants, waxes, and the like.

Embodiment 2: Nonaqueous Electrolyte Secondary Battery Laminated Separator

In the nonaqueous electrolyte secondary battery laminated separator in accordance with Embodiment 2 of the present invention, the porous layer in accordance with Embodiment 1 of the present invention is formed on one surface or both surfaces of the polyolefin porous film. The nonaqueous electrolyte secondary battery laminated separator includes the porous layer in accordance with an embodiment of the present invention. Therefore, the nonaqueous electrolyte secondary battery laminated separator brings about an effect of improving a capacity maintenance ratio shown when a nonaqueous electrolyte secondary battery including the nonaqueous electrolyte secondary battery laminated separator is repeatedly subjected to a charge-discharge cycle.

[Polyolefin Porous Film]

The nonaqueous electrolyte secondary battery laminated separator in accordance with an embodiment of the present invention (hereinafter, simply referred to also as a "laminated separator") includes a polyolefin porous film. The polyolefin porous film has therein many pores connected to one another. This allows a gas and a liquid to pass through the polyolefin porous film from one side to the other side. The polyolefin porous film can be a base material of the laminated separator. The polyolefin porous film can be one that imparts a shutdown function to the laminated separator by, when a battery generates heat, melting and thereby making the laminated separator non-porous.

Note, here, that a "polyolefin porous film" is a porous film which contains a polyolefin-based resin as a main component. Note that the phrase "contains a polyolefin-based resin as a main component" means that the porous film contains the polyolefin-based resin in a proportion of not less than 50% by volume, preferably not less than 90% by volume, and more preferably not less than 95% by volume, relative to the total amount of materials of which the porous film is made.

The polyolefin-based resin which the polyolefin porous film contains as a main component is not limited to any particular one. Examples of the polyolefin-based resin include homopolymers and copolymers which are each a thermoplastic resin and which are each obtained by polymerizing one or more monomers such as ethylene, propylene, 1-butene, 4-methyl-1-pentene, and/or 1-hexene. Specific examples of the homopolymers include polyethylene, polypropylene, and polybutene. Specific examples of the copolymers include an ethylene-propylene copolymer. The polyolefin porous film can be a layer which contains one type of polyolefin-based resin or can be alternatively a layer which contains two or more types of polyolefin-based resins. Among these polyolefin-based resins, polyethylene is more preferable because polyethylene makes it possible to prevent (shut down) a flow of an excessively large electric current at a lower temperature, and high molecular weight polyethylene which contains ethylene as a main component is particularly preferable. Note that the polyolefin porous film can contain a component other than polyolefin, provided that the component does not impair the function of the polyolefin porous film.

Examples of the polyethylene include low-density polyethylene, high-density polyethylene, linear polyethylene (ethylene-α-olefin copolymer), and ultra-high molecular weight polyethylene. Among these polyethylenes, ultra-high molecular weight polyethylene is more preferable, and ultra-high molecular weight polyethylene which contains a high molecular weight component having a weight-average molecular weight of $5\times10^5$ to $15\times10^6$ is still more preferable. In particular, the polyolefin-based resin which contains a high molecular weight component having a weight-average molecular weight of not less than 1,000,000 is more preferable, because such a polyolefin-based resin allows the polyolefin porous film and the nonaqueous electrolyte secondary battery laminated separator to each have increased strength.

The polyolefin porous film has a thickness of preferably 5 μm to 20 μm, more preferably 7 μm to 15 μm, and further preferably 9 μm to 15 μm. The polyolefin porous film which has a thickness of not less than 5 μm can sufficiently achieve functions (such as a function of imparting the shutdown function) which the polyolefin porous film is required to have. The polyolefin porous film which has a thickness of not more than 20 μm allows the resulting laminated separator to be thinner.

The pores in the polyolefin porous film each have a diameter of preferably not more than 0.1 μm, and more preferably not more than 0.06 μm. This makes it possible for the nonaqueous electrolyte secondary battery laminated separator to achieve sufficient ion permeability. Furthermore, this makes it possible to more prevent particles, which constitute an electrode, from entering the polyolefin porous film.

The polyolefin porous film typically has a weight per unit area of preferably 4 $g/m^2$ to 20 $g/m^2$, and more preferably 5 $g/m^2$ to 12 $g/m^2$, so as to allow a battery to have a higher weight energy density and a higher volume energy density.

The polyolefin porous film has an air permeability of preferably 30 s/100 mL to 500 s/100 mL, and more preferably 50 s/100 mL to 300 s/100 mL, in terms of Gurley values. This allows the laminated separator to achieve sufficient ion permeability.

The polyolefin porous film has a porosity of preferably 20% by volume to 80% by volume, and more preferably 30% by volume to 75% by volume. This makes it possible to (i) increase the amount of an electrolyte retained in the polyolefin porous film and (ii) absolutely prevent (shut down) a flow of an excessively large electric current at a lower temperature.

A method of producing the polyolefin porous film is not limited to a particular method, and any publicly known method can be employed. For example, a method can be employed which involves adding a filler to a thermoplastic resin, forming a resulting mixture into a film, and then removing the filler, as disclosed in Japanese Patent No. 5476844.

Specifically, when, for example, the polyolefin porous film is made of the polyolefin-based resin which contains ultra-high molecular weight polyethylene and low molecular weight polyolefin that has a weight-average molecular weight of not more than 10,000, the polyolefin porous film is preferably produced by, from the viewpoint of production costs, a method including the following steps (1) through (4):

(1) kneading 100 parts by weight of ultra-high molecular weight polyethylene, 5 parts by weight to 200 parts by weight of low molecular weight polyolefin which has a weight-average molecular weight of not more than 10,000, and 100 parts by weight to 400 parts by weight of an inorganic filler such as calcium carbonate to obtain a polyolefin-based resin composition;

(2) forming the polyolefin-based resin composition into a sheet;

(3) removing the inorganic filler from the sheet which has been obtained in the step (2); and (4) stretching the sheet which has been obtained in the step (3).

Alternatively, the polyolefin porous film may be produced by a method disclosed in any of the above-listed Patent Literatures.

The polyolefin porous film can be alternatively a commercially available product which has the above-described characteristics.

[Physical Properties of Nonaqueous Electrolyte Secondary Battery Laminated Separator and Porous Layer]

The laminated separator has an air permeability of preferably not more than 500 s/100 mL, and more preferably not more than 300 s/100 mL, in terms of Gurley values. The porous layer has an air permeability of preferably not more than 400 s/100 mL, and more preferably not more than 200 s/100 mL, in terms of Gurley values. When the air permeabilities of the laminated separator and the porous layer fall within the above respective ranges, the laminated separator and the porous layer each have sufficient ion permeability.

The air permeability of the porous layer is calculated by Y-X, where X represents the air permeability of the polyolefin porous film and Y represents the air permeability of the laminated separator. The air permeability of the porous layer can be adjusted by, for example, adjusting the intrinsic viscosity of one or more of the resins and/or the weight per unit area of the porous layer. Generally, as the intrinsic viscosity of a resin decreases, a Gurley value tends to decrease. As the weight per unit area of a porous layer decreases, a Gurley value tends to decrease.

The porous layer has a thickness of preferably not more than 10 μm, more preferably not more than 7 μm, and further preferably not more than 5 μm.

The pores in the porous layer each have a diameter of preferably 10 nm to 100 nm, and more preferably 10 nm to 50 nm. In a case where the pores in the porous layer have a diameter of not less than 10 nm, the pores are less likely to be blocked when the pores are deformed by external pressure. Meanwhile, in a case where the diameter of the pores in the porous layer is not more than 100 nm, with respect to external pressure, the pores themselves have high strength against external force, the pores are not easily deformed, and consequently the pores are less likely to be blocked. Therefore, by setting the diameter of the pores in the porous layer to the above range, when a charge-discharge cycle is repeated, the pores are less likely to be blocked, and it is possible to further improve the capacity maintenance ratio shown when the nonaqueous electrolyte secondary battery including the porous layer is repeatedly subjected to a charge-discharge cycle.

In addition to the polyolefin porous film and the porous layer, the laminated separator may have another layer as necessary. Examples of such a layer include an adhesive layer and a protective layer.

[Method of Producing Nonaqueous Electrolyte Secondary Battery Laminated Separator]

The laminated separator can be produced by forming the porous layer with use of a coating solution obtained by dissolving or dispersing the resin having an amide bond and optionally a filler in a solvent. Examples of a method of forming the coating solution include a mechanical stirring method, an ultrasonic dispersion method, a high-pressure dispersion method, and a media dispersion method. The solvent can be, for example, N-methylpyrrolidone, N,N-dimethylacetamide, N,N-dimethylformamide, or the like.

A method of producing the laminated separator can be, for example, a method which involves preparing the coating solution, applying the coating solution to the polyolefin porous film, and then drying the coating solution so that the porous layer is formed on the polyolefin porous film.

As a method of coating the polyolefin porous film with the coating solution, a publicly known coating method, such as a knife coater method, a blade coater method, a bar coater method, a gravure coater method, or a die coater method, can be employed.

The solvent (dispersion medium) is generally removed by a drying method. Examples of the drying method include natural drying, air-blow drying, heat drying, and drying under reduced pressure. Note, however, that any method can be employed, provided that the solvent (dispersion medium) can be sufficiently removed. Note also that drying can be carried out after the solvent (dispersion medium) contained in the coating material is replaced with another solvent. A method of replacing the solvent (dispersion medium) with another solvent and then removing the another solvent can be specifically as follows: (i) the solvent (dispersion medium) is replaced with a poor solvent having a low boiling point, such as water, alcohol, or acetone, (ii) a solute is deposited, and (iii) drying is carried out.

Embodiment 3: Nonaqueous Electrolyte Secondary Battery Member, and Embodiment 4: Nonaqueous Electrolyte Secondary Battery A nonaqueous electrolyte secondary battery member in accordance with Embodiment 3 of the present invention includes a positive electrode, the nonaqueous electrolyte secondary battery laminated separator in accordance with Embodiment 2, and a negative electrode which are disposed in this order. A nonaqueous electrolyte secondary battery in accordance with Embodiment 4 of the present invention includes the nonaqueous electrolyte secondary battery laminated separator in accordance with Embodiment 2 of the present invention.

Therefore, a nonaqueous electrolyte secondary battery member in accordance with an embodiment of the present invention brings about an effect of improving a capacity maintenance ratio shown when a nonaqueous electrolyte secondary battery including the nonaqueous electrolyte secondary battery member is repeatedly subjected to a charge-discharge cycle. A nonaqueous electrolyte secondary battery in accordance with an embodiment of the present invention brings about an effect of achieving an excellent capacity maintenance ratio when a charge-discharge cycle is repeated.

The nonaqueous electrolyte secondary battery in accordance with an embodiment of the present invention typically has a structure in which a negative electrode and a positive electrode face each other with the laminated separator sandwiched therebetween. The nonaqueous electrolyte secondary battery is configured such that a battery element, which includes the structure and an electrolyte with which the structure is impregnated, is enclosed in an exterior member. The nonaqueous electrolyte secondary battery is, for example, a lithium ion secondary battery which achieves an electromotive force through doping with and dedoping of lithium ions.

[Positive Electrode]

Examples of the positive electrode include a positive electrode sheet having a structure in which an active material layer including a positive electrode active material and a binding agent is formed on a current collector. The active material layer may further contain an electrically conductive agent.

Examples of the positive electrode active material include materials each capable of being doped with and dedoped of lithium ions.

Examples of the materials include lithium complex oxides each containing at least one type of transition metal such as V, Ti, Cr, Mn, Fe, Co, Ni, and/or Cu. Examples of the lithium complex oxides include lithium complex oxides each having a layer structure, lithium complex oxides each having a spinel structure, and solid solution lithium-containing transition metal oxides each constituted by a lithium complex oxide having both a layer structure and a spinel structure. Examples of the lithium complex oxides also include lithium cobalt complex oxides and lithium nickel complex oxides. Further, examples of the lithium complex oxides also include lithium complex oxides each obtained by substituting one or more of transition metal atoms, which constitute a large part of any of the above lithium complex oxides, with another or other elements such as Na, K, B, F, Al, Ti, V, Cr, Mn, Fe, Co, Ni, Cu, Zn, Mg, Ca, Ga, Zr, Si, Nb, Mo, Sn, and/or W.

Examples of the lithium complex oxides each obtained by substituting one or more of transition metal atoms, which constitute a large part of any of the above lithium complex oxides, with another or other elements include: lithium cobalt complex oxides each having a layer structure and each represented by Formula (5) below; lithium nickel complex oxides each represented by Formula (6) below; lithium-manganese complex oxides each having a spinel structure and each represented by Formula (7) below; and solid solution lithium-containing transition metal oxides each represented by Formula (8) below.

$$Li[Li_x(Co_{1-a}M^1_a)_{1-x}]O_2 \quad \text{Formula (5)}$$

where: $M^1$ is at least one type of metal selected from the group consisting of Na, K, B, F, Al, Ti, V, Cr, Mn, Fe, Ni, Cu, Zn, Mg, Ga, Zr, Si, Nb, Mo, Sn, and W; and $-0.1 \le x \le 0.30$ and $0 \le a \le 0.5$ are satisfied.

$$Li[Li_y(Ni_{1-b}M^2_b)_{1-y}]O_2 \quad \text{Formula (6)}$$

where: $M^2$ is at least one type of metal selected from the group consisting of Na, K, B, F, Al, Ti, V, Cr, Mn, Fe, Co, Cu, Zn, Mg, Ga, Zr, Si, Nb, Mo, Sn, and W; and $-0.1 \le y \le 0.30$ and $0 \le b \le 0.5$ are satisfied.

$$Li_zMn_{2-c}M^3_cO_4 \quad \text{Formula (7)}$$

where: $M^3$ is at least one type of metal selected from the group consisting of Na, K, B, F, Al, Ti, V, Cr, Fe, Co, Ni, Cu, Zn, Mg, Ga, Zr, Si, Nb, Mo, Sn, and W; and $0.9 \le z$ and $0 \le c \le 1.5$ are satisfied.

$$Li_{1+w}M^4_dM^5_eO_2 \quad \text{Formula (8)}$$

where: $M^4$ and $M^5$ are each independently at least one type of metal selected from the group consisting of Al, Ti, V, Cr, Mn, Fe, Co, Ni, Cu, Zn, Mg, and Ca; and $0<w \le 1/3$, $0 \le d \le 2/3$, $0 \le e \le 2/3$, and $w+d+e=1$ are satisfied.

Specific examples of the lithium complex oxides represented by Formulae (5) to (8) include $LiCoO_2$, $LiNiO_2$, $LiMnO_2$, $LiNi_{0.8}Co_{0.2}O_2$, $LiNi_{0.5}Mn_{0.5}O_2$, $LiNi_{0.85}Co_{0.10}Al_{0.05}O_2$, $LiNi_{0.8}Co_{0.15}Al_{0.05}O_2$, $LiNi_{0.5}Co_{0.2}Mn_{0.3}O_2$, $LiNi_{0.6}Co_{0.2}Mn_{0.2}O_2$, $LiNi_{0.33}Co_{0.33}Mn_{0.33}O_2$, $LiMn_2O_4$, $LiMn_{1.5}Ni_{0.5}O_4$, $LiMn_{1.5}Fe_{0.5}O_4$, $LiCoMnO_4$, $Li_{1.21}Ni_{0.20}Mn_{0.59}O_2$, $Li_{1.22}Ni_{0.20}Mn_{0.58}O_2$, $Li_{1.22}Ni_{0.15}Co_{0.10}Mn_{0.53}O_2$, $Li_{1.07}Ni_{0.35}Co_{0.08}Mn_{0.50}O_2$, and $Li_{1.07}Ni_{0.36}Co_{0.08}Mn_{0.49}O_2$.

Lithium complex oxides other than the lithium complex oxides represented by Formulae (5) to (8) can be also preferably used as the positive electrode active material. Examples of such lithium complex oxides include $LiNiVO_4$, $LiV_3O_6$, and $Li_{1.2}Fe_{0.4}Mn_{0.4}O_2$.

Examples of a material which can be preferably used as the positive electrode active material, other than the lithium complex oxides, include phosphates each having an olivine-type structure. Specific examples of such phosphates include phosphates each having an olivine-type structure and each represented by the following Formula (9).

$$Li_v(M^6_fM^7_gM^8_hM^9_i)_jPO_4 \quad \text{Formula (9)}$$

where: $M^6$ is Mn, Co, or Ni; $M^7$ is Ti, V, Cr, Mn, Fe, Co, Ni, Zr, Nb, or Mo; $M^8$ is a transition metal, optionally excluding the elements in the groups VIA and VIIA, or a representative element; $M^9$ is a transition metal, optionally excluding the elements in the groups VIA and VIIA, or a representative element; and $1.2 \ge a \ge 0.9$, $1 \ge b \ge 0.6$, $0.4 \ge c \ge 0$, $0.2 \ge d \ge 0$, $0.2 \ge e \ge 0$, and $1.2 \ge f \ge 0.9$ are satisfied.

In the positive electrode active material, each of surfaces of lithium metal complex oxide particles constituting the positive electrode active material is preferably coated with a coating layer. Examples of a material of which the coating layer is made include metal complex oxides, metal salts, boron-containing compounds, nitrogen-containing compounds, silicon-containing compounds, and sulfur-containing compounds. Among these materials, metal complex oxides are suitably used.

The metal complex oxides are preferably oxides each having lithium ion conductivity. Examples of such metal complex oxides include metal complex oxides of Li and at least one type of element selected from the group consisting of Nb, Ge, Si, P, Al, W, Ta, Ti, S, Zr, Zn, V, and B. When the positive electrode active material is a material particles of which each have a coating layer, the coating layer suppresses a side reaction which occurs at the interface between the positive electrode active material and the electrolyte substance at high voltages, and the resulting secondary battery can achieve a longer life. Moreover, the coating layer suppresses formation of a high-resistance layer at the interface between the positive electrode active material and the electrolyte substance, and the resulting secondary battery can achieve high output.

Examples of the electrically conductive agent include carbonaceous materials such as natural graphite, artificial graphite, cokes, carbon black, pyrolytic carbons, carbon fibers, and fired products of organic polymer compounds.

Examples of the binding agent include: thermoplastic resins such as polyvinylidene fluoride, a vinylidene fluoride copolymer, polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, thermoplastic polyimide, polyethylene, and polypropylene; acrylic resins; and styrene-butadiene rubber. Note that the binding agent serves also as a thickener.

Examples of the positive electrode current collector include electric conductors such as Al, Ni, and stainless steel. Among these electric conductors, Al is more preferable because Al is easily processed into a thin film and is inexpensive.

Examples of a method of producing the positive electrode sheet include: a method which involves pressure-molding, on the positive electrode current collector, the positive electrode active material, the electrically conductive agent, and the binding agent which constitute a positive electrode mix; and a method which involves (i) forming, into a paste, the positive electrode active material, the electrically conductive agent, and the binding agent with use of an appropriate organic solvent to obtain the positive electrode mix, (ii) coating the positive electrode current collector with the positive electrode mix, (iii) drying the positive electrode mix, and then (iv) pressuring the resulting sheet-shaped positive electrode mix on the positive electrode current collector so that the sheet-shaped positive electrode mix is firmly fixed to the positive electrode current collector.

[Negative Electrode]

The negative electrode can be, for example, a negative electrode sheet having a structure in which an active material layer, containing a negative electrode active material and a binding agent, is formed on a current collector. The active material layer may further contain an electrically conductive agent.

Examples of the negative electrode active material include carbon materials, chalcogen compounds (such as oxides and sulfides), nitrides, metals, and alloys each of which is capable of being doped with and dedoped of lithium ions at electric potentials lower than that of the positive electrode.

Examples of the carbon materials which can be used as the negative electrode active material include graphites such as natural graphite and artificial graphite, cokes, carbon black, pyrolytic carbons, carbon fibers, and fired products of organic polymer compounds.

Examples of the oxides which can be used as the negative electrode active material include: oxides of silicon which are represented by a formula $SiO_x$ (where x is a positive real number), such as $SiO_2$ and SiO; oxides of titanium which are represented by a formula $TiO_x$ (where x is a positive real number), such as $TiO_2$ and TiO; oxides of vanadium which are represented by a formula $V_xO_y$ (where x and y are each a positive real number), such as $V_2O_5$ and $VO_2$; oxides of iron which are represented by a formula $Fe_xO_y$ (where x and y are each a positive real number), such as $Fe_3O_4$, $Fe_2O_3$, and FeO; oxides of tin which are represented by a formula $SnO_x$ (where x is a positive real number) such as $SnO_2$ and SnO; oxides of tungsten which are represented by a general formula $WO_x$ (where x is a positive real number) such as $WO_3$ and $WO_2$; and complex metal oxides each of which contains lithium and titanium or vanadium, such as $Li_4Ti_5O_{12}$ and $LiVO_2$.

Examples of the sulfides which can be used as the negative electrode active material include: sulfides of titanium which are represented by a formula $Ti_xS_y$ (where x and y are each a positive real number), such as $Ti_2S_3$, $TiS_2$, and TiS; sulfides of vanadium which are represented by a formula $VS_x$ (where x is a positive real number), such as $V_3S_4$, $VS_2$, and VS; sulfides of iron which are represented by a formula $Fe_xS_y$ (where x and y are each a positive real number), such as $Fe_3S_4$, $FeS_2$, and FeS; sulfides of molybdenum which are represented by a formula $Mo_xS_y$ (where x and y are each a positive real number), such as $Mo_2S_3$ and $MoS_2$; sulfides of tin which are represented by a formula $SnS_x$ (where x is a positive real number) such as $SnS_2$ and SnS; sulfides of tungsten which are represented by a formula $WS_x$ (where x is a positive real number), such as $WS_2$; sulfides of antimony which are represented by a formula $Sb_xS_y$ (where x and y are each a positive real number), such as $Sb_2S_3$; and sulfides of selenium which are represented by a formula $Se_xS_y$ (where x and y are each a positive real number), such as $Se_5S_3$, $SeS_2$, and SeS.

Examples of the nitrides which can be used as the negative electrode active material include lithium-containing nitrides such as $Li_3N$ and $Li_{3-x}A_xN$ (where A is one or both of Ni and Co, and $0<x<3$ is satisfied).

Each of these carbon materials, oxides, sulfides, and nitrides may be used alone or two or more of these carbon materials, oxides, sulfides, and nitrides may be used in combination. These carbon materials, oxides, sulfides, and nitrides can be each crystalline or amorphous. One or more of these carbon materials, oxides, sulfides, and nitrides are mainly supported by the negative electrode current collector, and the resulting negative electrode current collector is used as an electrode.

Examples of the metals which can be used as the negative electrode active material include lithium metals, silicon metals, and tin metals.

It is also possible to use a complex material which contains Si or Sn as a first constituent element and also contains second and/or third constituent elements. The second constituent element is, for example, at least one type of element selected from cobalt, iron, magnesium, titanium, vanadium, chromium, manganese, nickel, copper, zinc, gallium, and zirconium. The third constituent element is, for example, at least one type of element selected from boron, carbon, aluminum, and phosphorus.

In particular, since a high battery capacity and excellent battery characteristics are achieved, the above metal material is preferably a simple substance of silicon or tin (which may contain a slight amount of impurities), $SiO_v$ ($0<v\leq 2$), $SnO_w$ ($0\leq w\leq 2$), an Si—Co—C complex material, an Si—Ni—C complex material, an Sn—Co—C complex material, or an Sn—Ni—C complex material.

Examples of the negative electrode current collector include Cu, Ni, and stainless steel. Among these materials, Cu is more preferable because Cu is not easily alloyed with lithium particularly in a lithium-ion secondary battery and is easily processed into a thin film.

Examples of a method of producing the negative electrode sheet include: a method which involves pressure-molding, on the negative electrode current collector, the negative electrode active material which constitutes a negative electrode mix; and a method which involves (i) forming the negative electrode active material into a paste with use of an appropriate organic solvent to obtain the negative electrode mix, (ii) coating the negative electrode current collector with the negative electrode mix, (iii) drying the negative electrode mix, and then (iv) pressing the resulting sheet-shaped negative electrode mix on the negative electrode current collector so that the sheet-shaped negative electrode mix is firmly fixed to the negative electrode current collector. The paste preferably contains an electrically conductive agent as described above and a binding agent as described above.

[Nonaqueous Electrolyte]

The nonaqueous electrolyte can be, for example, a nonaqueous electrolyte obtained by dissolving a lithium salt in an organic solvent. Examples of the lithium salt include $LiClO_4$, $LiPF_6$, $LiAsF_6$, $LiSbF_6$, $LiBF_4$, $LiSO_3F$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (BOB refers to bis(oxalato)borate), lower aliphatic carboxylic acid lithium salt, and $LiAlCl_4$. Each of these lithium salts may be used alone or two or more of these lithium salts may be used as a mixture. Among these lithium salts, it is preferable to use at least one fluorine-containing lithium salt selected from the group consisting of $LiPF_6$, $LiAsF_6$, $LiSbF_6$, $LiBF_4$, $LiSO_3F$, $LiCF_3SO_3$, $LiN(SO_2CF_3)_2$, and $LiC(SO_2CF_3)_3$.

Examples of the organic solvent include carbonates such as propylene carbonate, ethylene carbonate, dimethyl carbonate, diethyl carbonate, ethyl methyl carbonate, 4-trifluoromethyl-1,3-dioxolane-2-on, and 1,2-di(methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and compounds each prepared by introducing a fluoro group into any of these organic solvents (i.e., compounds each prepared by substituting one or more hydrogen atoms of any of these organic solvents with one or more respective fluorine atoms).

The organic solvent is preferably a mixed solvent obtained by mixing two or more of the above organic solvents. Particularly, the organic solvent is preferably a mixed solvent containing a carbonate, further preferably a mixed solvent containing a cyclic carbonate and an acyclic carbonate or a mixed solvent containing a cyclic carbonate and an ether. The mixed solvent containing a cyclic carbonate and an acyclic carbonate is preferably a mixed solvent containing ethylene carbonate, dimethyl carbonate, and ethyl methyl carbonate. The nonaqueous electrolyte which contains such a mixed solvent has advantages of having a wider operating temperature range, being less prone to deterioration even when used at a high voltage, being less prone to deterioration even when used for a long period of time, and less prone to decomposition even when the negative electrode active material is a graphite material such as natural graphite or artificial graphite.

It is preferable to use, as the nonaqueous electrolyte, a nonaqueous electrolyte containing (i) a lithium salt containing fluorine (such as $LiPF_6$) and (ii) an organic solvent containing a fluorine substituent, because such a nonaqueous electrolyte allows the resulting nonaqueous electrolyte secondary battery to have increased safety. It is further preferable to use a mixed solvent containing a dimethyl carbonate and an ether having a fluorine substituent (such as pentafluoropropyl methylether or 2,2,3,3-tetrafluoropropyl difluoro methylether), because such a mixed solvent allows the resulting nonaqueous electrolyte secondary battery to have a high capacity maintenance ratio even when the nonaqueous electrolyte secondary battery is discharged at a high voltage.

[Method of Producing Nonaqueous Electrolyte Secondary Battery Member and Method of Producing Nonaqueous Electrolyte Secondary Battery]

A method of producing the nonaqueous electrolyte secondary battery member can be, for example, a method which involves disposing the positive electrode, the nonaqueous electrolyte secondary battery laminated separator in accordance with an embodiment of the present invention, and the negative electrode in this order.

A method of producing the nonaqueous electrolyte secondary battery can be, for example, the following method. First, the nonaqueous electrolyte secondary battery member is placed in a container which is to be a housing of the nonaqueous electrolyte secondary battery. Next, the container is filled with the nonaqueous electrolyte, and then the container is hermetically sealed while pressure inside the container is reduced. In this manner, it is possible to produce the nonaqueous electrolyte secondary battery.

The present invention is not limited to the embodiments, but can be altered variously by a skilled person in the art within the scope of the claims. The present invention also encompasses, in its technical scope, any embodiment derived by appropriately combining technical means disclosed in differing embodiments.

EXAMPLES

The following description will discuss embodiments of the present invention in more detail with reference to Examples and Comparative Examples. Note, however, that the present invention is not limited to such Examples and Comparative Examples.

[Methods of Measuring Various Physical Property Values]

Physical property values of a resin having an amide bond, a porous layer, a laminated separator including the nonporous layer, and a nonaqueous electrolyte secondary battery which were prepared in Examples and Comparative Examples described later were measured by methods below.

[Thickness]

Thicknesses of the laminated separator and the porous film were measured with the use of a high-precision digital measuring device (VL-50) manufactured by Mitutoyo Corporation. Further, a difference between the thickness of the laminated separator and the thickness of the porous film was calculated, and the difference was regarded as a thickness of the porous layer.

[Weight Per Unit Area]

In advance, a sample in the form of an 8 cm square was cut out from each of porous films which had been used in Examples and Comparative Examples described later, and a weight W(g) of the sample was measured. Then, a weight per unit area of the porous film was calculated according to the following Formula (10).

$$\text{Weight per unit area of porous film (g/m}^2\text{)}=W/(0.08\times 0.08) \quad \text{Formula (10)}$$

Similarly, a sample in the form of an 8 cm square was cut out from the laminated separator, and a weight W(g) of the sample was measured. Then, a weight per unit area of the laminated separator was calculated according to the following Formula (11).

$$\text{Weight per unit area (g/m}^2\text{) of laminated separator}=W/(0.08\times 0.08) \quad \text{Formula (11)}$$

A weight per unit area of the porous layer was calculated according to the following Formula (12) with use of the weight per unit area of the laminated separator and the weight per unit area of the porous film.

$$\text{Weight per unit area (g/m}^2\text{) of porous layer}=\text{(weight per unit area of laminated separator)}-\text{(weight per unit area of porous film)} \quad \text{Formula (12)}$$

[Intrinsic Viscosity]

The intrinsic viscosity was measured by the following measurement method. A solution was prepared by dissolving 0.5 g of a resin having an amide bond in 100 mL of 96% to 98% sulfuric acid. Subsequently, with use of a capillary viscometer, a period of time which the solution took to flow through the capillary viscometer at 30° C. and a period of time which 96% to 98% sulfuric acid took to flow through the capillary viscometer at 30° C. were measured, and an intrinsic viscosity was calculated by the following expression with use of a ratio of the measured periods of time.

$$\text{Intrinsic viscosity}=\ln(T/T_0)/C \text{ (unit: dL/g)}$$

In the above expression, T and $T_0$ respectively represent the periods of time taken by the sulfuric acid solution of the resin having an amide bond and the sulfuric acid to flow through the capillary viscometer, and C represents a concentration (g/dL) of the resin having an amide bond in the sulfuric acid solution of the resin having an amide bond.

[Aspect Ratio of Pore in Porous Layer]

A nonaqueous electrolyte secondary battery laminated separator produced in each of Examples and Comparative Examples was used as a measurement sample. A straight portion that passes through a center of the measurement sample and extends in parallel with MD of the measurement sample was cut in a direction perpendicular to the surface by an ion milling method (IB-19520 (manufactured by JEOL Ltd.)). A cross section of the measurement sample thus obtained was observed with use of a scanning electron microscope (SEM, S-4800 (manufactured by Hitachi High-Technologies Corporation)) under conditions in which an acceleration voltage was 0.8 kV, a working distance (WD) was 3 mm, a reflection electron image was obtained, and an image resolution was 2.48 nm/pix. Thus, a cross-sectional view was obtained. Subsequently, an image analysis was carried out with respect to the cross-sectional view, and an image was obtained in which pores and a solid portion in the porous layer were shown in two gradation levels. With respect to the image, an area of arbitrary one of pores of the porous layer was measured. Further, a greatest diameter of the one pore whose area had been measured was measured, and the greatest diameter thus measured was regarded as "2a". Further, the one pore whose area and greatest diameter had been measured was approximated to an ellipsoid by rotating the one pore about a central axis which coincided with the greatest diameter, and a greatest diameter of the ellipsoid in a direction perpendicular to the central axis was measured and regarded as "2b". These measurements were carried out by software (TRI/3D-BON-FCS: 2D particle analysis option) manufactured by Ratoc System Engineering Co., Ltd.

After that, an aspect ratio of the one pore was calculated on the basis of the following Formula (1) by using the measured values of "2a" and "2b".

$$\text{Aspect ratio of pore}=2a/2b \quad \text{Formula (1)}$$

Subsequently, the aspect ratio was calculated for all of the pores in the image with the above described method. Then an average value of the obtained aspect ratios of all of the pores was calculated and regarded as the "aspect ratio of a pore" in the porous layer.

<Preparation of Nonaqueous Electrolyte Secondary Battery for Test>

A nonaqueous electrolyte secondary battery for a test was produced by a method shown in the following steps 1 through 4 with use of nonaqueous electrolyte secondary battery laminated separators obtained in Examples and Comparative Examples described later.

1. A positive electrode and a negative electrode were prepared. The positive electrode was an electrode hoop which had been purchased from Hassan Co., Ltd and which had a thickness of 58 μm and a density of 2.5 g/cm$^3$. The composition of a positive electrode active material was such that the amount of $LiNi_{0.5}Co_{0.2}Mn_{0.3}O_2$ was 92 parts by weight, the amount of an electrically conductive agent was 5 parts by weight, and the amount of a binding agent was 3 parts by weight. The negative electrode was an electrode hoop which had been purchased from Hassan Co., Ltd and which had a thickness of 48 μm and a density of 1.5 g/cm$^3$. The composition of a negative electrode active material was such that the amount of natural graphite was 98 parts by weight, the amount of a binding agent was 1 part by weight, and the amount of carboxymethyl cellulose was 1 part by weight.
2. A nonaqueous electrolyte secondary battery member was produced. The positive electrode, the laminated separator, and the negative electrode were disposed in this order in a laminate pouch. In so doing, the laminated separator was disposed such that (i) the porous layer of the laminated separator and a positive electrode active material layer of the positive electrode were in contact with each other and (ii) a polyethylene porous film of the laminated separator and a negative electrode active material layer of the negative electrode were in contact with each other.
3. The nonaqueous electrolyte secondary battery member was stored in a bag which was made up of an aluminum layer and a heat-sealing layer that was formed on the aluminum layer, and 230 μL of a nonaqueous electrolyte was injected into the bag. The nonaqueous electrolyte was one that had been prepared by dissolving $LiPF_6$ at a concentration of 1 mol/L in a mixed solvent obtained by mixing ethylene carbonate, ethyl methyl carbonate, and diethyl carbonate at a ratio of 3:5:2 (volume ratio).

4. The bag was heat-sealed while pressure inside the bag was reduced. A nonaqueous electrolyte secondary battery for a test was thus produced.

<Measurement of Capacity Maintenance Ratio>

The nonaqueous electrolyte secondary battery for the test was subjected to one cycle of initial charge and discharge in a voltage range of 2.7 V to 4.2 V; and a current values of 0.1 C (charge) and 0.2 C (discharge), at 25° C. (where the value of an electric current at which a battery rated capacity defined as a one-hour rate discharge capacity was discharged in one hour was assumed to be 1 C; the same applies hereinafter).

After the initial charge and discharge were carried out, 10 cycles of charge and discharge were carried out at electric current values of 1 C (charge) and 5 C (discharge), and aging was carried out.

Subsequently, the nonaqueous electrolyte secondary battery after the aging was charged and discharged at a charge electric current value of 1.0 C and discharge electric current values of 0.2 C and 5 C at 25° C., and discharge capacities under the respective conditions, i.e., a discharge capacity at 0.2 C and a discharge capacity at 5 C were measured.

After the measurement, the obtained discharge capacity at 0.2 C and discharge capacity at 5 C were used to calculate a capacity maintenance ratio based on the following expression.

Capacity maintenance ratio=100×(discharge capacity at 5 C)/(discharge capacity at 0.2 C)

Example 1

<Preparation of Composition>

A composition was prepared by a method which included the following steps (a) through (g).

(a) A 5-L separable flask having a stirring blade, a thermometer, a nitrogen incurrent canal, and a powder addition port was sufficiently dried.

(b) 4217 g of NMP was introduced into the flask. Further, 324.22 g of calcium chloride (which had been dried at 200° C. for 2 hours) was added, and a resulting mixture was heated to 100° C. The calcium chloride was completely dissolved to obtain a solution of calcium chloride. Here, in the solution of calcium chloride, a concentration of calcium chloride was 7.14% by weight, and a water content was adjusted to be 500 ppm.

(c) To the solution of calcium chloride, 151.559 g of 4,4'-diaminodiphenylsulfone (DDS) was added while the temperature was maintained at 100° C., and the DDS was completely dissolved to obtain a solution A(1).

(d) The resulting solution A(1) was cooled to 25° C. After that, to the solution A(1) which had been cooled, a total of 123.304 g of terephthalic acid dichloride (TPC) was added in three separate portions while the temperature was maintained at 25±2° C. A reaction was then caused to occur for 1 hour, and a reaction solution A(1) was obtained. In the reaction solution A(1), a block A(1) which was constituted by poly(4,4'-diphenylsulfonyl terephthalamide) was prepared.

(e) To the reaction solution A(1) obtained, 66.007 g of paraphenylenediamine (PPD) was added, and completely dissolved over 1 hour to obtain a solution B(1).

(f) To the solution B(1), a total of 123.059 g of TPC was added in three separate portions while the temperature was maintained at 25±2° C. A reaction was then caused to occur for 1.5 hours, and a reaction solution B(1) was obtained. In the reaction solution B(1), blocks B(1), each of which was constituted by poly(paraphenylene terephthalamide), extended on both sides of the block A(1).

(g) While the temperature of the reaction solution B(1) was maintained at 25±2° C., the solution was matured for 1 hour. After that, the solution was stirred for 1 hour under reduced pressure, and air bubbles were removed. As a result, a solution was obtained which contained a block copolymer (1) in which the block A(1) accounted for 50% of the entirety of a molecule and the block B(1) accounted for the remaining 50% of the entirety of the molecule. The block copolymer (1) is a resin having an amide bond.

In another flask different from the separable flask, 0.5 L of ion-exchange water was introduced. Further, 50 mL of the solution containing the block copolymer (1) was weighed and collected. After that, 50 mL of the collected solution containing the block copolymer (1) was added to said another flask, and the block copolymer (1) was deposited. The deposited block copolymer (1) was separated by a filtration operation to obtain a composition (1) which was constituted by 3.75 g of the block copolymer (1). Note that, in the filtration operation, the solution remained after the deposition of the block copolymer (1) was filtered once, and then 100 mL of ion-exchange water was added to the resulting deposit and filtration was carried out again. That is, filtration was carried out twice. The above described intrinsic viscosity measurement was carried out and, as a result, an intrinsic viscosity of the composition (1) obtained was 1.19 dL/g.

<Preparation of Porous Layer and Laminated Separator>

To 5000 g of the solution containing the block copolymer (1), 9.51 L of NMP was added, and a solution in which the block copolymer (1) was dissolved and dispersed was obtained. To the solution in which the block copolymer (1) had been dissolved and dispersed, 375.0 g of aluminum oxide (average particle diameter: 0.013 μm) was added. A resulting mixture was uniformly dispersed with use of a pressure type disperser to prepare a coating solution (1). A solid content concentration of the coating solution was 5% by weight.

The coating solution was applied to a polyethylene porous film (thickness: 9.7 μm, weight per unit area: 5.6 $g/m^2$), and the polyethylene porous film to which the coating solution was applied was treated in an oven at 50° C. and a humidity of 70% for 2 minutes so that a porous layer was formed. After that, the resulting polyethylene porous film and porous layer were washed with water and dried to obtain a laminated separator including the porous layer.

Example 2

A solution containing a block copolymer (2) in which the block A(2) accounted for 50% of the entirety of a molecule and the block B(2) accounted for the remaining 50% of the entirety of the molecule, and 3.5 g of a composition (2) were obtained in a manner similar to that in Example 1, except that the amount of DDS used in the step (c) was changed to 140.816 g, the total amount of TPC used in each of the steps (d) and (f) was changed to 228.901 g, and the amount of PPD used in the step (f) was changed to 61.328 g. The intrinsic viscosity measurement was carried out and, as a result, an intrinsic viscosity of the composition (2) obtained was 1.11 dL/g. The block copolymer (2) is a resin having an amide bond.

A coating solution was prepared and a laminated separator was obtained in a manner similar to that in Example 1, except that 4000 g of the solution containing the block copolymer (2) was used instead of the solution containing the block copolymer (1), the amount of NMP used was changed to 6.83 L, the amount of aluminum oxide used was changed to 280.0 g, and a polyethylene porous film (thickness: 10.7 μm, weight per unit area: 5.8 $g/m^2$) which was different from that in Example 1 was used as a polyethylene porous film.

Example 3

A solution containing a block copolymer (3) in which the block A(3) accounted for 50% of the entirety of a molecule and the block B(3) accounted for the remaining 50% of the entirety of the molecule, and a composition (3) constituted by 3.5 g of the block copolymer (3) were obtained in a manner similar to that in Example 1, except that the amount of DDS used in the step (c) was changed to 140.659 g, the total amount of TPC used in each of the steps (d) and (f) was changed to 227.942 g, and the amount of PPD used in the step (e) was changed to 61.259 g. The intrinsic viscosity measurement was carried out and, as a result, an intrinsic viscosity of the composition (3) obtained was 1.64 dL/g. The block copolymer (3) is a resin having an amide bond.

A coating solution (3) was obtained in a manner similar to that in Example 2, except that a solution containing the block copolymer (3) was used instead of the solution containing the block copolymer (2). A laminated separator was obtained in a manner similar to that in Example 1, except that the coating solution (3) was used instead of the coating solution (1).

Example 4

A solution containing a block copolymer (4) in which the block A(4) accounted for 50% of the entirety of a molecule and the block B(4) accounted for the remaining 50% of the entirety of the molecule, and a composition (4) constituted by 3.5 g of the block copolymer (4) were obtained in a manner similar to that in Example 1, except that the amount of NMP used in the step (b) was changed to 4177 g, the amount of calcium chloride used in the step (b) was changed to 366.29 g, the amount of DDS used in the step (c) was changed to 140.853 g, the total amount of TPC used in each of the steps (d) and (f) was changed to 227.615 g, the amount of PPD used in the step (e) was changed to 61.344 g, the temperature of the solution A(4) in the step (d) was changed to 20° C., the temperature of the solution B(4) in the step (g) was changed to 20° C., and the water content in the step (b) was adjusted to 400 ppm. The intrinsic viscosity measurement was carried out and, as a result, an intrinsic viscosity of the composition (4) obtained was 1.65 dL/g. The block copolymer (4) is a resin having an amide bond.

A coating solution was prepared and a laminated separator was obtained in a manner similar to that in Example 3, except that a solution containing the block copolymer (4) was used instead of the solution containing the block copolymer (3).

Example 5

A solution containing a block copolymer (5) in which the block A(5) accounted for 50% of the entirety of a molecule and the block B(5) accounted for the remaining 50% of the entirety of the molecule, and a composition (5) constituted by 3.5 g of the block copolymer (5) were obtained in a manner similar to that in Example 1, except that the amount of NMP used in the step (b) was changed to 4177 g, the amount of calcium chloride used in the step (b) was changed to 366.29 g, the amount of DDS used in the step (c) was changed to 141.119 g, the total amount of TPC used in each of the steps (d) and (f) was changed to 226.911 g, the amount of PPD used in the step (e) was changed to 61.460 g, the temperature of the solution A(5) in the step (d) was changed to 20° C., the temperature of the solution B(5) in the step (g) was changed to 20° C., and the water content in the step (b) was adjusted to 300 ppm. The intrinsic viscosity measurement was carried out and, as a result, an intrinsic viscosity of the composition (5) obtained was 1.57 dL/g. The block copolymer (5) is a resin having an amide bond.

A coating solution was prepared and a laminated separator was obtained in a manner similar to that in Example 3, except that a solution containing the block copolymer (5) was used instead of the solution containing the block copolymer (3).

Example 6

A solution containing a block copolymer (6) in which the block A(6) accounted for 50% of the entirety of a molecule and the block B(5) accounted for the remaining 50% of the entirety of the molecule, and a composition (6) constituted by 3.5 g of the block copolymer (6) were obtained in a manner similar to that in Example 1, except that the amount of NMP used in the step (b) was changed to 4177 g, the amount of calcium chloride used in the step (b) was changed to 366.29 g, the amount of DDS used in the step (c) was changed to 141.119 g, the total amount of TPC used in each of the steps (d) and (f) was changed to 226.911 g, the amount of PPD used in the step (e) was changed to 61.460 g, the temperature of the solution A(6) in the step (d) was changed to 20° C., the temperature of the solution B(6) in the step (g) was changed to 20° C., and the water content in the step (b) was adjusted to 300 ppm. The intrinsic viscosity measurement was carried out and, as a result, an intrinsic viscosity of the composition (6) obtained was 1.51 dL/g. The block copolymer (6) is a resin having an amide bond.

A coating solution (6) was prepared in a manner similar to that in Example 3, except that a solution containing the block copolymer (6) was used instead of the solution containing the block copolymer (3).

The coating solution (6) was applied to a polyethylene porous film (thickness: 9.7 μm, weight per unit area: 5.6 $g/m^2$), and the polyethylene porous film to which the coating solution (6) was applied was immersed in a solution which was adjusted at a ratio of ion-exchange water:NMP=40:60 (weight ratio). Thus, a coating layer (6) was formed on the polyethylene porous film. After that, the coating layer (6) was washed with water and dried to form a porous layer, and a laminated separator including the porous layer was obtained.

Example 7

A solution containing a block copolymer (7) in which the block A(7) accounted for 70% of the entirety of a molecule and the block B(7) accounted for the remaining 30% of the entirety of the molecule, and a composition (7) constituted by 3.5 g of the block copolymer (7) were obtained in a manner similar to that in Example 1, except that the amount of NMP used in the step (a) was changed to 4208 g, the amount of calcium chloride used was changed to 365.92 g, the amount of DDS used in the step (c) was changed to 181.462 g, the total amount of TPC used in each of the steps (d) and (f) was changed to 210.276 g, the amount of PPD used in the step (f) was changed to 33.870 g, the temperature of the solution A(7) in the step (d) was changed to 20° C., the temperature of the solution B(7) in the step (g) was changed to 20° C., and the water content in the step (b) was adjusted to 300 ppm. The intrinsic viscosity measurement was carried out and, as a result, an intrinsic viscosity of the composition (7) obtained was 1.65 dL/g. The block copolymer (7) is a resin having an amide bond.

A coating solution (7) was prepared in a manner similar to that in Example 3, except that a solution containing the block copolymer (7) was used instead of the solution containing the block copolymer (3). A laminated separator was obtained in a manner similar to that in Example 6, except that the coating solution (7) was used instead of the coating solution (6).

Comparative Example 1

<Preparation of Composition>

A composition was prepared by a method which included the following steps (a') through (e').

(a') A 5-L separable flask having a stirring blade, a thermometer, a nitrogen incurrent canal, and a powder addition port was sufficiently dried.

(b') 4280 g of NMP was introduced into the flask. Further, 329.1 g of calcium chloride (which had been dried at 200° C. for 2 hours) was added, and a resulting mixture was heated to 100° C. The calcium chloride was completely dissolved to obtain a solution of calcium chloride. Here, in the solution of calcium chloride, a concentration of calcium chloride was 7.14% by weight, and a water content was adjusted to be 450 ppm.

(c') To the solution of calcium chloride, 138.932 g of PPD was added while the temperature was maintained at 30±2° C., and the PPD was completely dissolved to obtain a comparative solution A(1).

(d') The resulting comparative solution A(1) was cooled to 20° C. After that, to the comparative solution A(1) which had been cooled, a total of 251.499 g of terephthalic acid dichloride (TPC) was added in three separate portions while the temperature was maintained at 20±2° C. A reaction was then caused to occur for 1 hour, and a comparative reaction solution A(1) was obtained.

(e') While the temperature of the comparative reaction solution A(1) was maintained at 20±2° C., the solution was matured for 1 hour. After that, the solution was stirred for 1 hour under reduced pressure, and air bubbles were removed. As a result, a solution containing a comparative polymer (1) constituted by poly(paraphenylene terephthalamide) was obtained. The comparative polymer (1) is a resin having an amide bond.

In another flask different from the separable flask, 0.5 L of ion-exchange water was introduced. Further, 50 mL of the solution containing the comparative polymer (1) was weighed and collected. After that, 50 mL of the collected solution containing the comparative polymer (1) was added to said another flask, and the comparative polymer (1) was deposited. The deposited comparative polymer (1) was separated by a filtration operation to obtain a comparative composition (1) which was constituted by 3 g of the comparative polymer (1). Note that, in the filtration operation, the solution remained after the deposition of the comparative polymer (1) was filtered once, and then 100 mL of ion-exchange water was added to the resulting deposit and filtration was carried out again. That is, filtration was carried out twice. The intrinsic viscosity measurement was carried out and, as a result, an intrinsic viscosity of the comparative composition (1) obtained was 1.72 dL/g.

A laminated separator was obtained in a manner similar to that in Example 1, except that the solution containing the comparative polymer (1) was used instead of the solution containing the block copolymer (1), and that the amount of NMP used was changed to 7.92 L and the amount of aluminum oxide used was changed to 300.0 g.

Comparative Example 2

Synthesis Example 1

(a") A 5-L separable flask having a stirring blade, a thermometer, a nitrogen incurrent canal, and a powder addition port was sufficiently dried.

(b") 4089 g of NMP was introduced into the flask. Further, 314.4 g of calcium chloride (which had been dried at 200° C. for 2 hours) was added, and a resulting mixture was heated to 100° C. The calcium chloride was completely dissolved to obtain a solution of calcium chloride. Here, in the solution of calcium chloride, a concentration of calcium chloride was 7.14% by weight, and a water content was adjusted to be 500 ppm.

(c") To the solution of calcium chloride, 329.281 g of DDS was added while the temperature was maintained at 100° C., and the DDS was completely dissolved to obtain a comparative solution A(2).

(d") The resulting comparative solution A(2) was cooled to 20° C. After that, to the comparative solution A(2) which had been cooled, a total of 266.568 g of terephthalic acid dichloride (TPC) was added in three separate portions while the temperature was maintained at 20±2° C. A reaction was then caused to occur for 1 hour, and a comparative reaction solution A(2) was obtained.

(e") While the temperature of the comparative reaction solution A(2) was maintained at 20±2° C., the solution was matured for 1 hour. After that, the solution was stirred for 1 hour under reduced pressure, and air bubbles were removed. As a result, a solution containing a comparative polymer (2) constituted by poly(4,4'-diphenylsulfonyl terephthalamide) was obtained.

A comparative composition (2) was obtained in a manner similar to that in Comparative Example 1, with use of the comparative polymer (2) instead of the comparative polymer (1). The intrinsic viscosity measurement was carried out and, as a result, an intrinsic viscosity of the comparative composition (2) was 0.85 dL/g.

Synthesis Example 2

A solution containing a comparative polymer (3) constituted by poly(paraphenylene terephthalamide) was obtained in a manner similar to that in Comparative Example 1, except that the amount of PPD used in the step (c') was changed to 138.57 g and the total amount of TPC used in the step (d') was changed to 252.06 g. A comparative composition (3) was obtained in a manner similar to that in Comparative Example 1, with use of the comparative polymer (3) instead of the comparative polymer (1). The intrinsic viscosity measurement was carried out and, as a result, an intrinsic viscosity of the comparative composition (3) was 1.90 dL/g.

A porous layer which contained the comparative polymer (2) and the comparative polymer (3) at a weight ratio of 50:50 was prepared. Specifically, the solutions synthesized in Synthesis Examples 1 and 2 were mixed so that the weight ratio between the comparative polymer (2) and the comparative polymer (3) was 50:50, and 4000 g of a mixed solution was obtained. A laminated separator was obtained in a manner similar to that in Example 2, except that 4000 g of the mixed solution containing the comparative polymer (2) and the comparative polymer (3) was used instead of 5000 g of the solution containing the block copolymer (2), and that the amount of NMP used was changed to 7.61 L and the amount of aluminum oxide used was changed to 300.0 g.

[Results]

Table 1 below shows results of measuring, by the above described methods, the physical property values of the resins each having an amide bond, the porous layers, and the laminated separators which were prepared in Examples 1 through 7 and Comparative Examples 1 and 2, and the capacity maintenance ratios of nonaqueous electrolyte secondary batteries each including the laminated separator.

TABLE 1

| | Resin having amide bond | Laminated separator | Porous layer | | | | Nonaqueous electrolyte secondary battery |
|---|---|---|---|---|---|---|---|
| | Intrinsic viscosity [dL/g] | Weight per unit area [g/m²] | Thickness [μm] | Weight per unit area [g/m²] | Air permeability [s/100 cc] | Aspect ratio or pore | Capacity maintenance ratio [%] |
| Example 1 | 1.19 | 7.88 | 12.9 | 1.8 | 288 | 2.12 | 35 |
| Example 2 | 1.11 | 7.85 | 12.8 | 1.7 | 242 | 2.05 | 32 |
| Example 3 | 1.64 | 7.75 | 12.6 | 1.7 | 274 | 2.13 | 34 |
| Example 4 | 1.65 | 7.84 | 12.5 | 1.7 | 268 | 2.09 | 33 |
| Example 5 | 1.57 | 7.71 | 12.6 | 1.7 | 268 | 1.98 | 31 |
| Example 6 | 1.51 | 7.74 | 13.0 | 1.7 | 262 | 1.91 | 31 |
| Example 7 | 1.65 | 7.89 | 12.8 | 1.7 | 210 | 1.98 | 36 |
| Comparative Example 1 | 1.72 | 7.79 | 13.0 | 1.7 | 302 | 2.31 | 30 |
| Comparative Example 2 | 1.90<br>0.85 | 7.83 | 13.3 | 1.8 | 248 | 2.21 | 30 |

[Conclusion]

As shown in Table 1, when the nonaqueous electrolyte secondary batteries in Examples 1 through 7 each including the porous layer having the aspect ratio of a pore of not less than 1.0 and not more than 2.2 are repeatedly charged and discharged, the capacity maintenance ratios of those nonaqueous electrolyte secondary batteries are greater than the capacity maintenance ratios shown when the nonaqueous electrolyte secondary batteries in Comparative Examples 1 and 2 each including the porous layer having the aspect ratio of a pore of more than 2.2 are repeatedly charged and discharged. Therefore, it has been found that the porous layer in accordance with an embodiment of the present invention can improve the capacity maintenance ratio shown when a nonaqueous electrolyte secondary battery is repeatedly subjected to a charge-discharge cycle.

INDUSTRIAL APPLICABILITY

The nonaqueous electrolyte secondary battery porous layer in accordance with an embodiment of the present invention can be suitably utilized as a member of a nonaqueous electrolyte secondary battery which is excellent in a capacity maintenance ratio shown when a charge-discharge cycle is repeated.

The invention claimed is:

1. A nonaqueous electrolyte secondary battery porous layer comprising at least one type of a resin having an amide bond, wherein an aspect ratio of a pore which is represented by Formula (1) is not less than 1.0 and not more than 2.2, $$\text{Aspect ratio of pore} = 2a/2b \qquad \text{Formula (1)}$$

wherein: 2a represents a greatest diameter of a pore in the porous layer; and 2b represents, in an ellipsoid obtained by rotating the pore of the porous layer about a central axis which coincides with a greatest diameter, a greatest diameter in a direction perpendicular to the central axis, and wherein the at least one type of the resin having the amide bond is a block copolymer including a block A containing, as a main component, units each represented by Formula (2), and a block B containing, as a main component, units each represented by Formula (3):

$$\text{—(NH—Ar}^1\text{—NHCO—Ar}^2\text{—CO)—} \qquad \text{Formula (2)}$$

$$\text{—(NH—Ar}^3\text{—NHCO—Ar}^4\text{—CO)—} \qquad \text{Formula (3)}$$

wherein:

$Ar^1$, $Ar^2$, $Ar^3$, and $Ar^4$ may each vary from unit to unit, $Ar^1$, $Ar^2$, $Ar^3$, and $Ar^4$ are each independently a divalent group having one or more aromatic rings, not less than 50% of all $Ar^1$ each have a structure in which two aromatic rings are connected by a sulfonyl bond, not more than 50% of all $Ar^3$ each have a structure in which two aromatic rings are connected by a sulfonyl bond, and 10% to 70% of all $Ar^1$ and $Ar^3$ each have a structure in which two aromatic rings are connected by a sulfonyl bond.

2. The nonaqueous electrolyte secondary battery porous layer as set forth in claim 1, further comprising a filler, a contained amount of the filler being not less than 20% by weight and not more than 90% by weight relative to a total weight of said nonaqueous electrolyte secondary battery porous layer.

3. A nonaqueous electrolyte secondary battery laminated separator comprising:

a polyolefin porous film; and a nonaqueous electrolyte secondary battery porous layer recited in claim 1, the nonaqueous electrolyte secondary battery porous layer being formed on one surface or both surfaces of the polyolefin porous film.

4. A nonaqueous electrolyte secondary battery member, comprising a positive electrode, a nonaqueous electrolyte secondary battery porous layer recited in claim 1, and a negative electrode which are disposed in this order.

5. A nonaqueous electrolyte secondary battery comprising a nonaqueous electrolyte secondary battery porous layer recited in claim 1.

6. A nonaqueous electrolyte secondary battery member, comprising a positive electrode, a nonaqueous electrolyte secondary battery laminated separator recited in claim 3, and a negative electrode which are disposed in this order.

7. A nonaqueous electrolyte secondary battery comprising a nonaqueous electrolyte secondary battery laminated separator recited in claim 3.

* * * * *